March 17, 1931.                R. ESNAULT-PELTERIE                1,796,687
                                 PISTON CONNECTION
                                 Filed Jan. 16, 1929

Inventor:
Robert Esnault-Pelterie,
By his Attorneys,

Patented Mar. 17, 1931

1,796,687

UNITED STATES PATENT OFFICE

ROBERT ESNAULT-PELTERIE, OF PARIS, FRANCE

PISTON CONNECTION

Application filed January 16, 1929, Serial No. 333,004, and in Great Britain January 19, 1928.

This invention relates to pistons for hydraulic power transmission apparatus and/or pumps and more particularly to pistons and piston actuating means for use in such apparatus, and the invention has for its object to provide an improved construction of piston and actuating means therefor with a view of avoiding lateral friction and occasionally even rupture of the parts by transverse stresses incidental thereto during the working of the apparatus.

According to the present invention the piston and an actuating or piston rod therefor are loosely associated together by means of a tubular extension of the piston surrounding the actuating rod, contact between the actuating rod and the piston being obtained by a spring having a point of support on a member adapted to be reciprocated. In the preferred construction the actuating rod is provided with a pointed end adapted to bear against a recess in the piston of a slightly greater angle of conicity than the pointed rod end the piston being provided with an integral or rigidly attached sleeve which surrounds the actuating rod between which and the said sleeve a certain amount of play or clearance is provided.

In order that the invention may be clearly understood and readily carried into effect, reference is made to the accompanying drawing which shows diagrammatically and by way of example a construction in accordance with the present invention.

Figure 1:
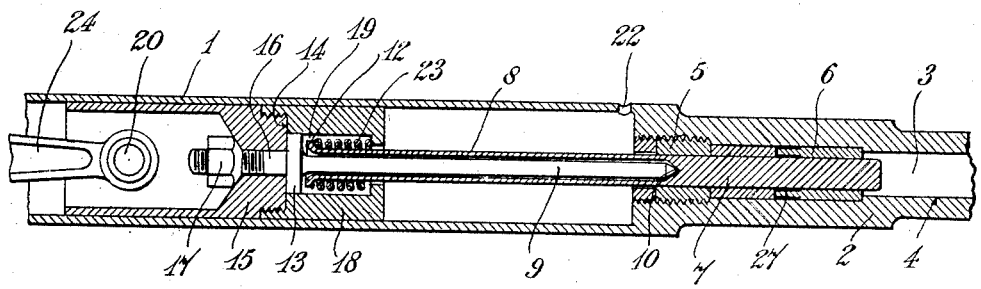

Figure 1 is a longitudinal section of part of an apparatus in accordance with the present invention.

Figure 2:
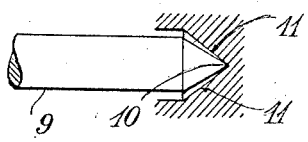

Figure 2 drawn to an enlarged scale is a detail view of the piston actuating rod end and the adjacent part of the piston.

Referring to the drawing which shows in section part of a hydraulic power transmission apparatus or pump, 1 is an outer tubular guiding member, which is integral with a hollow cylindrical reduced part 2. A fluid or semi-fluid medium 3 to be compressed is disposed in the bore 4 of the cylindrical part 2, the latter carrying two centering rings 5, 6 which surround a piston 7 having a sleeve-extension 8, the latter surrounding a rod 9 between which and the sleeve 8 a slight amount of play or clearance is allowed. The rod 9 is pointed or of conical form at its outer end as at 10, see more particularly Figure 2, which end co-operates with a surface 11 of a slightly greater angle of conicity than the pointed end 10 of the rod 9. At its rear end the sleeve is flared or flanged as at 12 and the aforesaid rod is provided with a collar 13 which abuts against the inner end surface 14 of a cross-head 15, the end 16 of the rod 9 being rigidly secured in the cross-head 15 by means of a nut 17 and screw-thread on the end 16 of the rod. Suitably interconnected with the cross-head 15 is a block 18 in which is a recess 19 to receive the flared or flanged end 12 of the sleeve extension 8 of the piston 7. It will be seen that a certain amount of play or clearance is allowed between the collar 13 and the flared or flanged end 12 of the extension sleeve 8. The cross-head 15 may be fitted with a pivot pin 20 receiving the end of a connecting rod 24 so that any displacement of the latter is communicated to the rod 9 which displaces the piston 7 the movement of which produces a pressure in the power transmitting medium 3 in the bore 4 of the cylinder 2. 27 is packing interposed between the two centering rings 5 and 6, and 22 is a vent hole.

It will be readily understood that during the outer stroke of the cross-head 15 and when the pressure of the medium 3 decreases the piston 7 may have a tendency to be retained by the friction of the packing 27 or rings 5—6 so that it would abandon contact with rod 9. Such a device would then be improper for a suction pump. To avoid that difficulty a helical spring 23 is disposed around the sleeve extension 8 of the piston 7 with sufficient play to permit of its lateral freedom. At one end such spring 23 presses on the flange 12 of the sleeve extension 8 and at the other one it presses against an abutment provided in the block 18 secured to the cross-head 15, so that it always compels the sleeve extension 8 and piston 7 to follow the return movement of the cross-head 15, whether the medium 3 be under pressure or not.

It will be understood from the foregoing description read in conjunction with the drawing that the rod 9 is free to oscillate in all directions by reason of the point contact of the pointed end 10 with the recess 11 and also because of the clearance or play between the rod 9, the sleeve extension 8, the flanged or flared end and the collar 13. The piston 7 can thus remain exactly centered in the centering rings 5, 6 which are disposed one on each side of the packing 27 so that the packing joint cannot be torn or ruptured by transverse displacements which may occur in apparatus heretofore in use. It should be clearly understood however that the movement of the cross-head 15 and block 18 as a rigid whole may be effected in any suitable manner.

Furthermore, the invention is not limited to the use of an actuating rod having a conical or pointed end, inasmuch as any form of bearing between the said rod and piston which will permit of articulation therebetween will relieve the piston of lateral forces that would otherwise be imparted thereto through the actuating rod.

While only a single embodiment of the invention has been hereinbefore described and illustrated, it will be understood that the invention is not limited thereto but may be otherwise variously embodied and modified without departing from the spirit thereof, as set forth in the following claims.

What I claim is:—

1. Fluid pressure apparatus, including a reciprocatable piston, a guided cross-head, a compression-sustaining element interposed therebetween, said element being adapted to abut against the piston in such manner as to permit at least a slight universal movement between the element and the piston, and a spring interposed between the cross-head and the piston tending to hold the latter in contact with said compression-sustaining element.

2. Fluid pressure apparatus, including a piston, a bore within which said piston reciprocates, a guided cross-head sliding substantially in alignment with said bore, a rod interposed between said piston and said cross-head, said rod being mechanically connected to said cross-head and adapted to abut against a surface of the piston, a member connected to said piston and extending therefrom along said rod but separated from such rod, and a spring interposed between said member and the cross-head, said spring exerting a force through said member tending to hold the rod in contact with the piston.

3. Fluid pressure apparatus including a reciprocatable piston, a guided cross-head, a rod interposed therebetween, said rod abutting against said piston in such manner as to permit relative angular displacement of their axes, a tension member external to said rod and secured to said piston, a spring surrounding said member, a seat on said member engaged by one end of said spring, and an abutment for said spring carried by the said cross-head at a point between the piston and the said seat, the stress of such spring tending to move the piston and cross-head toward each other so as to hold the said rod in yielding contact with the piston.

4. The apparatus according to claim 3, further characterized in that the said member secured to the piston consists of a tubular element loosely surrounding the said rod.

5. The apparatus according to claim 3, further characterized in that the said member secured to the piston consists of a tubular element surrounding the said rod and radially separated therefrom a sufficient distance to permit small angular displacement thereof relative to the piston upon which said tubular element is mounted.

6. The apparatus according to claim 3, further characterized in that the said member secured to the piston consists of a tubular element loosely surrounding the said rod, one end of said element being rigidly secured to the piston and the other end being outwardly flanged to provide a seat for the said spring.

7. The apparatus according to claim 3, further characterized in that the said cross-head is recessed to receive the free end of the tension member, said member comprising a tubular element having an outwardly-projecting flange, the recess opening in said cross-head being restricted to afford an abutment for one end of the said spring, the other end of the spring bearing against the flange of said tubular element.

8. Fluid pressure apparatus including a reciprocatable piston, a two-part cross-head, a rod connected at one end to one part of the cross-head, the other end of the rod abutting against a surface of the piston in such manner as to permit articulation therebetween, a tubular member loosely embracing said rod and at one end rigidly connected with said piston, the opposite end of said member extending within the second part of said cross-head and flaring therewithin, and a helical compression spring surrounding said member and interposed between the flared portion thereof and the cross-head part within which the member extends, whereby the force of the spring will be transmitted through the member to yieldingly hold the end of the said rod against the cross-head.

9. In a fluid pressure apparatus, the combination of a reciprocatable piston, a guided cross-head, a compression-sustaining element interposed therebetween, said element being operatively connected with said piston in such manner as to permit articulation therebetween, and a member rigidly connected with said piston and loosely embracing said pressure-sustaining element, the said member extending from the piston along the said compression-sustaining element a distance equal to at least one-half the length of said element between the piston and the cross-head.

In testimony whereof I have hereunto signed my name.

ROBERT ESNAULT-PELTERIE.